United States Patent
Mielenhausen (10) Patent No.: US 10,042,889 B2
(45) Date of Patent: Aug. 7, 2018

(54) PSEUDO COLUMNS FOR DATA RETRIEVAL

(71) Applicant: SAP SE, Walldorf (DE)

(72) Inventor: Bjoern Mielenhausen, Walldorf (DE)

(73) Assignee: SAP SE, Walldorf (DE)

( * ) Notice: Subject to any disclaimer, the term of this patent is extended or adjusted under 35 U.S.C. 154(b) by 306 days.

(21) Appl. No.: 14/944,952

(22) Filed: Nov. 18, 2015

(65) Prior Publication Data

US 2017/0140000 A1  May 18, 2017

(51) Int. Cl.
*G06F 17/00* (2006.01)
*G06F 17/30* (2006.01)

(52) U.S. Cl.
CPC .. *G06F 17/30489* (2013.01); *G06F 17/30424* (2013.01); *G06F 17/30554* (2013.01)

(58) Field of Classification Search
CPC .................. G06F 17/30424; G06F 17/30477
See application file for complete search history.

(56) References Cited

U.S. PATENT DOCUMENTS

| | | | |
|---|---|---|---|
| 2004/0205078 A1* | 10/2004 | Galindo-Legaria . | G06F 17/3046 |
| 2005/0097100 A1* | 5/2005 | Galindo-Legaria . | G06F 17/3046 |
| 2008/0140696 A1* | 6/2008 | Mathuria ........... | G06F 17/30315 |
| 2014/0172908 A1* | 6/2014 | Konik ............... | G06F 17/30477 707/769 |

* cited by examiner

*Primary Examiner* — Cheryl Lewis
(74) *Attorney, Agent, or Firm* — Buckley, Maschoff & Talwalkar LLC (57) ABSTRACT

Various embodiments of systems and methods for retrieving data from database are described herein. A query is received at a user application connected with a database system. The received query may be referred as a user request to retrieve data from database tables stored in the database. The query is processed and analyzed to interpret the user request for retrieving the requisite data. A return set is retrieved from the database based on the received query. Once, the required data is fetched from the database, the return set having the requisite data may be free from duplicate columns that is sent to the user application.

14 Claims, 4 Drawing Sheets

PSEUDO COLUMNS FOR DATA RETRIEVAL

FIELD

The disclosed embodiments generally relate to software program development tools and techniques, including processes and apparatuses for controlling data processing operations pertaining to the development, maintenance, and installation of software programs.

BACKGROUND

Computer query languages provide a medium for a user to interact and communicate with database storage systems or information systems. The user may query a database and have a return set returned. The user may create views or underlying tables from the stored database tables that are helpful when implementing complex calculations. Often, changes in the underlying tables are updated in original database tables. This introduces complexities, and registration of updates of the underlying tables into the database may result in error prone data.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques to retrieve data based on a pseudo column expression, are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily referring to the same embodiment. Furthermore, the particular features, structures, or characteristics may be combined in any suitable manner in one or more embodiments.

Database systems or database management systems create and manage data or information. Data in a database can be accessed and modified using database query languages. Query languages facilitate end-user communication with database systems. The term 'database' relates to a collection of information or data organized in such a manner that a program can select and retrieve desired pieces of data as and when required. A database management system stores programs that enable users to enter, organize, and select data in a database. Database query languages are specialized database programming languages for requesting information from a database stored in database systems or any other computer storage systems, where data can be stored, modified, updated, and retrieved. In one embodiment, the term 'query' may be a 'request' for obtaining information from a database. The query language includes a set of rules for formulating database queries.

In one embodiment, the query language may be, for example, a structured query language (SQL). SQL commands are used to perform different database operations, such as, updating data to a database, retrieving data from the database, etc. The standard SQL commands may include 'SELECT', 'INSERT', 'UPDATE', 'DELETE', 'CREATE', 'MERGE', 'TRUNCATE' and 'DROP'. SQL commands may be used to accomplish database related tasks, such as, updating, organizing, or retrieving data from the database. Additionally, SQL may also include clauses, such as, 'WHERE', 'FROM', 'JOIN', 'GROUP BY', 'HAVING', and 'ORDER BY'. SQL clauses may be used with the SQL commands to formulate complex SQL queries. SQL also includes operators for implementing conditions in a SQL query. The list of SQL operators may include '=', '<>', '>', '<', '>=', '<=', 'BETWEEN', 'LIKE', 'IN', 'IS', 'IS NOT', and 'IS NOT DISTINCT FROM', etc.

Figure 1:
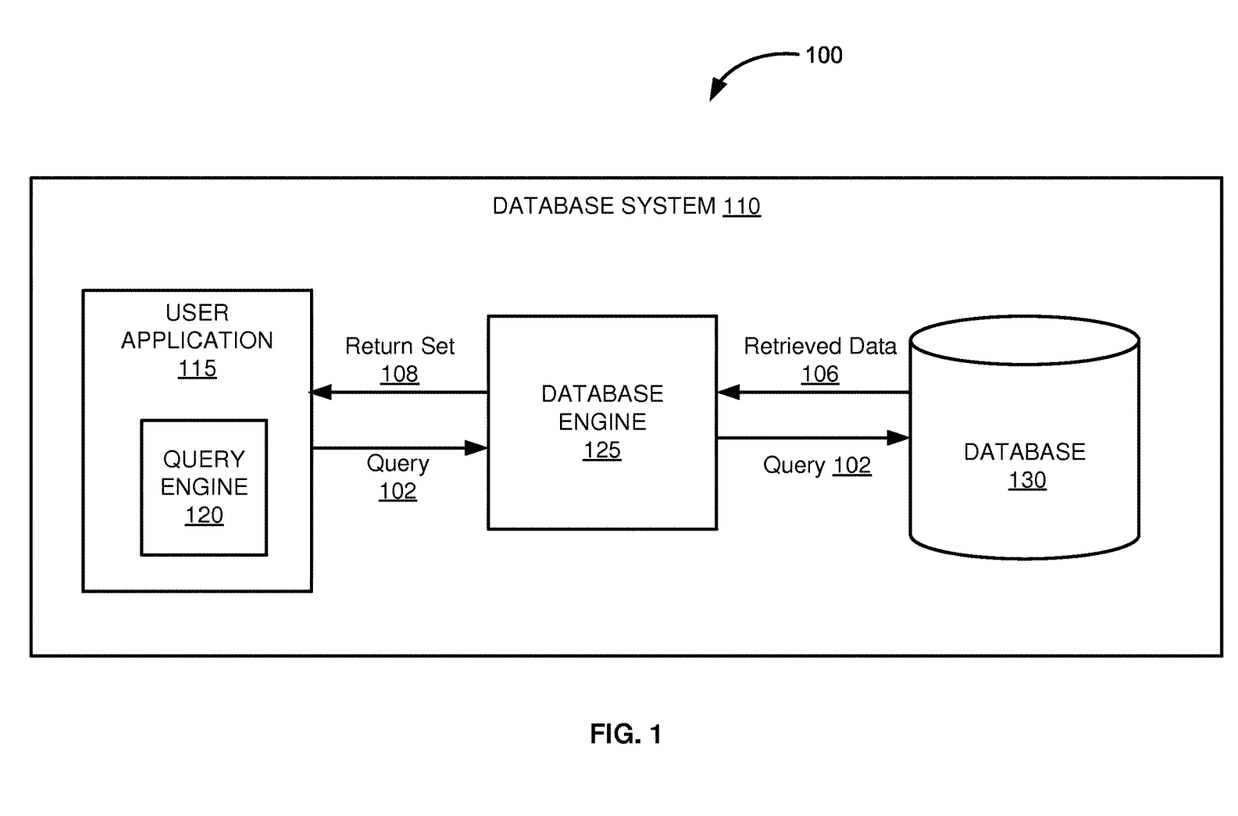
FIG. 1 is a block diagram illustrating a high-level architecture of a system for data retrieval, according to one embodiment.

FIG. 1 is a block diagram illustrating a high-level architecture of a system 100 for retrieving data from a database 130, according to an embodiment. The system 100 may include a database system 110. In one embodiment, the database system 110 may include a computer application that interacts with users, different database systems, user application 115, and database 130 to capture and analyze data. The database system 110 may execute operations on the stored data based on received user requests. The users interact with the database system 110 via the user application 115. The user application 115 may include a query engine 120 that receives user requests submitted at the user application 115. The user requests may be received for creating, modifying, updating, retrieving, and/or deleting data from the database 130. In one embodiment, the user requests are queries written in a specialized query language such as SQL. Database queries written in SQL enables the database engine 125 to understand the user requests and requested details. For example, a user request received as a SQL query (q.1) may be "SELECT ALL WHERE AGE >30 AND NAME="JOHN" FROM EMPLOYEE_TABLE" The query (q.1) requests retrieval of employee information that are greater than 30 years of age and have a name 'John' from an "EMPLOYEE_TABLE".

In one embodiment, an expression '( . . . )' may be included in the query. The expression '( . . . )' may be termed as pseudo column expression. The pseudo column expression '( . . . )' may be used for retrieving data from the database 130. In one embodiment, the pseudo column expression '( . . . )' may be used in place of an asterisk expression '*', that is used for retrieving data, in a SQL query. For example, consider "EMPLOYEE TABLE", Table 1, stored in the database 130.

TABLE 1

(EMPLOYEE_TABLE)

| ID | NAME | AGE | LOCATION | SALARY |
|---|---|---|---|---|
| 1 | John Smith | 30 | Palo Alto | 4500 |
| 2 | Austin Fernandes | 48 | Santa Clara | 8500 |
| 3 | Stanis Baratheon | 32 | Waldorf | 5200 |
| 4 | Jack Goodwill | 41 | Seattle | 8570 |
| 5 | Scott Bunker | 50 | Palo Alto | 10000 |
| 6 | Owen Linson | 35 | Waldorf | 5290 |
| 7 | Abraham Scott | 29 | Chicago | 4500 |

A query (q.2) "SELECT EMPLOYEE_TABLE.NAME AS EMPLOYEE NAME ( . . . ) FROM EMPLOYEE_TABLE WHERE SALARY LIKE '85%'" is submitted at the query engine 120 of the user application 115 for retrieving data from the 'EMPLOYEE_TABLE', Table 1. The query (q.2) may include the pseudo column expression '( . . . )' for retrieving data from the 'EMPLOYEE_TABLE', Table 1, stored in the database 130. The query engine 120 of the user application 115 may receive end-user submitted query (q.2). The query engine 120 may send the received query 102 to database engine 125. The database engine 125 executes the received query 102 and returns a return set 108 to the user application 115. To analyze the received query 102, the database engine 125 forwards the query 102 to the database 130 for retrieving data from the 'EMPLOYEE_TABLE' Table 1, stored in the database 130. The database 130 returns a retrieved data 106 to the database engine 125. The database engine 125 may determine a return set 108 by excluding the duplicate data column(s) from the retrieved data. The database engine 125 forwards the return set 108 to the user application 115. For example, the return set 108 received at the user application 115 for the query (q.2) is shown in Table 2 below:

TABLE 2

(RETURN SET)

| ID | EMPLOYEE NAME | AGE | LOCATION | SALARY |
|---|---|---|---|---|
| 2 | Austin Fernandes | 48 | Santa Clara | 8500 |
| 4 | Jack Goodwill | 41 | Seattle | 8570 |

The pseudo column expression '( . . . )' is defined to select columns from the 'EMPLOYEE_TABLE', based on the condition 'SALARY' starts with the numerical value '85' in query (q.2), and then exclude duplicate column(s) from the retrieved data 106 having same data under different column names. For example, based on the condition, "SELECT EMPLOYEE_TABLE.NAME AS EMPLOYEE NAME" in query (q.2), the pseudo column expression '( . . . )' returns the renamed column 'EMPLOYEE NAME' in place of 'NAME' in the return set 108, as shown in Table 2. The two tuples (rows), shown in Table 2, that satisfies the condition, in query (q.2) are returned in the return set 108. In one embodiment, if the end-user submits the query (q.2) using asterisk expression '*' instead of the pseudo column expression '( . . . )' then the retrieved data 106 from the database 130 is forwarded to the user application 115 as the return set 108, shown in Table 2, without removing the duplicate columns.

TABLE 3

(RETURN SET)

| EMPLOYEE ID | EMPLOYEE NAME | NAME | AGE | LOCATION | SALARY |
|---|---|---|---|---|---|
| 2 | Austin Fernandes | Austin Fernandes | 48 | Santa Clara | 8500 |
| 4 | Jack Goodwill | Jack Goodwill | 41 | Seattle | 8570 |

As illustrated in the Table 3, data for employee name column are returned twice under the column headings 'EMPLOYEE NAME' and 'NAME'. This is because, based on the query, the retrieved column 'NAME' is renamed as column "EMPLOYEE NAME' in the query (q.2). Additionally, when the asterisk expression '*' in the query is processed then the data for employee name are retrieved for the 'EMPLOYEE_NAME' column and the 'NAME' column from the 'EMPLOYEE_TABLE', Table 1. The use of asterisk expression '*' in the SQL query therefore includes duplicate entries of employee data under column names 'EMPLOYEE NAME' and 'NAME' in the return set 108. Another issue using the asterisk expression '*' is that if a view of the database table 'EMPLOYEE_TABLE' is created, this change may result in updating the underlying table with duplicate entries. For example, a 'VIEW' of the database table 'EMPLOYEE_TABLE' may be updated with columns headings 'EMPLOYEE NAME' and 'NAME' having same data. This causes more data to move from the database engine 125 to the user application 115 that may result in slow access to database 130 and increase load on a computer system. Since, more data required to retrieved and moved, the return set 108 may take more time to travel across the network.

However, when the pseudo column expression '( . . . )' is used instead of the asterisk expression '*', it retrieves the employee names only once. As shown in Table 2, the return set 108 including the column 'NAME' is retrieved only once from the database table 'EMPLOYEE_TABLE', under the renamed column heading 'EMPLOYEE NAME' based on the query q2 that includes the pseudo column expression '( . . . )'. Therefore, the pseudo column expression '( . . . )' excludes duplicate column(s) from the data 106 retrieved from the database 130. In other words, the pseudo column expression '( . . . )' may optimize the retrieved data 106 and determines the return set 108 by excluding duplicate column(s). Therefore, the pseudo column expression '( . . . )' determines only a single copy of data in the return set 108. This causes less data to move from the database engine 125 to the user application 115 that may result in fast access to database 130 and reduces load on the computer system. In addition, as the returned data is optimized, the return set 108 may be transmitted across the network in lesser time.

In one embodiment, the database system 110 may include one or more databases similar to database 130 operating in different or same computer network. In another embodiment, the database system 110 may receive queries from other computer systems installed with similar user applications 115. The end-user requests from other computer systems are received at the database system 110 through the application programming interface (API) calls.

Figure 2:
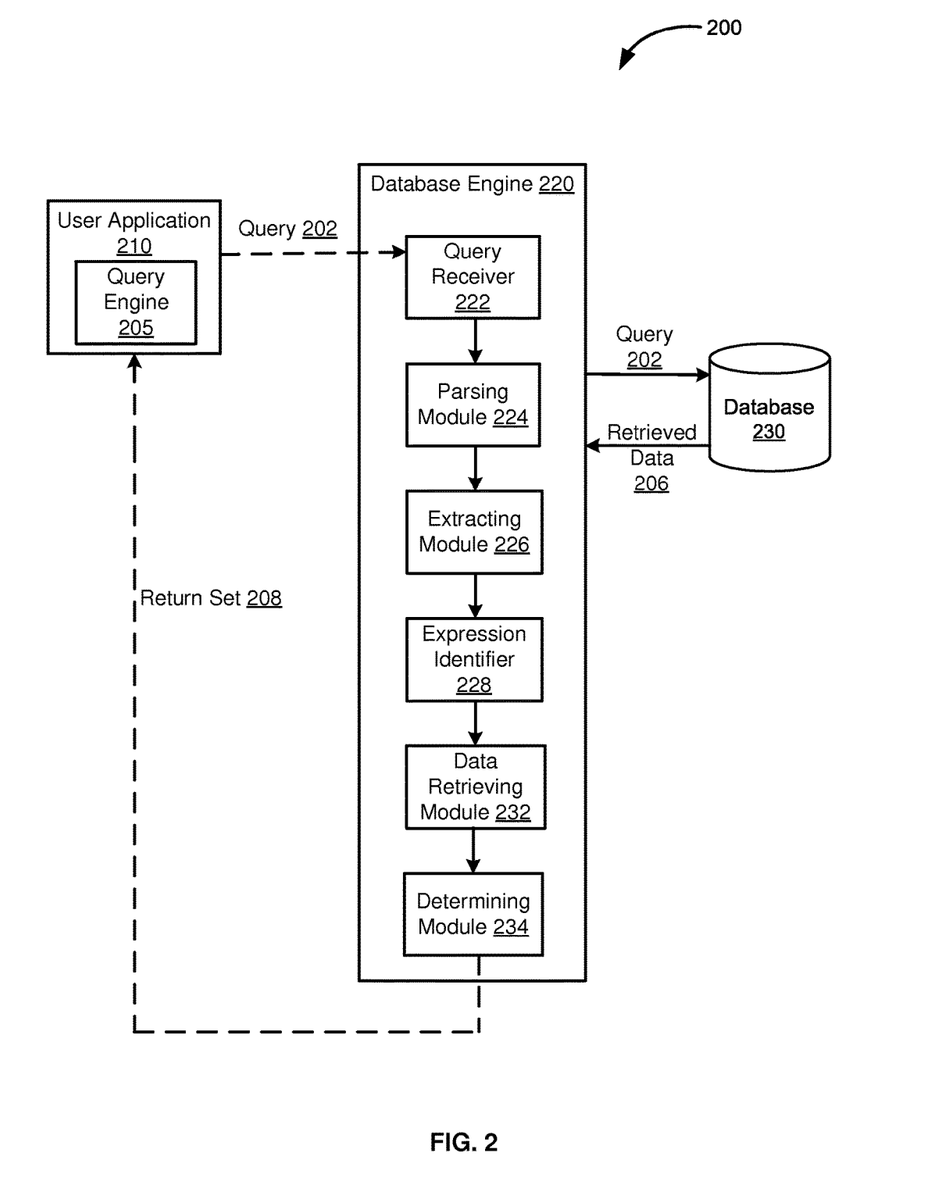
FIG. 2 is a block diagram illustrating an architecture of a system for data retrieval, according to another embodiment.

FIG. 2 is a block diagram illustrating an architecture of a system 200 for data retrieval, in another embodiment. The system 200 includes a user application 210, database engine 220 and database 230. In one embodiment, the user application 210, database engine 220 and database 230 may be installed either in a same computer system or in different computer systems operating in same network or different computer networks. In another embodiment, the computer systems installed with the user application 210, database engine 220 and database 230 may be operating in one or more distributed computer networks. The user application 210 may be a user interface enabling end-users to communicate or interact with the database 230 by submitting database queries. Database queries are treated as user requests for retrieving, inserting, modifying and/or updating data or information stored in the database 230. Database queries may be written in a query language such as structured query language (SQL). In one embodiment, the queries may include pseudo column expression '( . . . )' for retrieving data from the database 230. The pseudo column expression '( . . . )' may optimize the received query and may further optimize data returned in a return set 208.

The user application 210 may include a query engine 205. The query engine 205 may receive database queries related to object-oriented domain model as well as queries related to database tables and columns. In one embodiment, the query engine 205 may receive end-user submitted SQL queries. The user application 210 may send the received query 202 to the database engine 220. The database engine 220 may analyze the user requests and perform operations as requested in the received query 202. The operations may be performed on the database such as to insert and store new data, to modify or update existing data, or to retrieve data from the database 230. The query engine 205 may include parser and optimizer to parse and optimize SQL queries based on the requests received from the end-users.

In one embodiment, the database engine 220 may include query receiver 222, parsing module 224, extracting module 226, expression identifier 228, data retrieving module 232 and determining module 234. When the SQL query is submitted at the user application 210 by the end-user, the query engine 205 receives the query. After internally parsing and optimizing the received query 202 at the query engine 205, the user application 210 sends the received query to the database engine 220. For example, consider following database tables, Table 4 for 'CUSTOMER' and Table 5 for 'CUSTOMER ORDER' stored in the database 230:

TABLE 4

(CUSTOMER)

| ID | NAME | AGE | ADDRESS | PURCHASE |
|---|---|---|---|---|
| 1 | Sheldon Cooper | 30 | Delhi | 2000.00 |
| 2 | Leonard Hoffman | 28 | Newtown Square | 1500.00 |
| 3 | Raj Khurana | 35 | Heidelberg | 5000.00 |
| 4 | Geneva | 41 | Bangalore | 6500.00 |
| 5 | Catelyn Stark | 43 | Sydney | 8500.00 |
| 6 | Jojen Reed | 35 | San Jose | 4500.00 |
| 7 | Michael Paul | 32 | Munich | 10000.00 |

TABLE 5

(CUSTOMER_ORDER)

| OID | DATE | CUSTOMER_ID | AMOUNT |
|---|---|---|---|
| 102 | 2015-08-08 00:00:00 | 3 | 1800 |
| 100 | 2015-09-10 00:00:00 | 3 | 1500 |
| 101 | 2015-01-20 00:00:00 | 4 | 2000 |
| 104 | 2015-04-23 00:00:00 | 2 | 1500 |
| 103 | 2015-03-15 00:00:00 | 7 | 2500 |
| 105 | 2015-08-12 00:00:00 | 7 | 1000 |
| 106 | 2015-08-12 00:00:00 | 7 | 3000 |

Considering that the aforementioned tables are stored in the database 230, the query engine 205 of the user application 210 may receive a query (q.3) submitted by the end-user:

(q.3) SELECT CUSTOMER.ID AS CID, CUSTOMER.ADDRESS AS ADD, * FROM CUSTOMER;

Once the query (q.3) is internally parsed and optimized at the query engine 205, the user application 210 sends the received query (q.3) 202 to the database engine 220. At the database engine 220, the query receiver 222 receives the query (q.3) 202. The query receiver 222 checks the SQL query and sends it to the parsing module 224. The parsing module 224 may process the received query by making a parse call to the database 230. When the parse call is made, the parsing module 224 first checks whether the received query (q.3) has syntactic validity based on the 'CUSTOMER' database table stored in the database 230. The parsing module 224 also syntactically validates spellings and correct usage of keywords, for example, spelling of 'CUSTOMER' table, or spellings of the 'SELECT', 'AS', 'FROM' SQL command and the like. Secondly, the parsing module 224 semantically validates query construction of the received query (q.3). For example, parsing module 224 validates whether the 'CUSTOMER' table and the corresponding columns in the 'CUSTOMER' table exists in the database 230. Parsing the received query (q.3) may also involve segregating the data structure and other routine calls. In one embodiment, the step of parsing prepares the received query (q.3) for its execution. Once successfully parsed by the parsing module 224, the parsed query (q.3) is received by the extracting module 226. If the received query (q.3) is determined to be invalid with respect to syntactic validity and semantic validity then an error message is generated. The database engine 220 sends the error message to the user application 210, notifying the end-user about the errors in the previously submitted query (q.3).

In one embodiment, the extracting module 226 of the database engine 220 may extract projections associated with the parsed query (q.3). In one embodiment, projections may relate to the columns (or expression) that the query may return. There may be different types of projections, namely, an inbound projection and an outbound projection. In one embodiment, the extracting module 226 may extract the inbound projection and the outbound projection associated with the parsed query. In an exemplary embodiment, a SQL query may include instructions to rename existing column name(s) of a database table(s) to new column name(s). The existing column names and the expression provided in the SQL query constitutes the inbound projection. The new column names provided in the SQL query, to rename the existing columns and the column names returned by the provided expression constitutes the outbound projection. The inbound projection may relate to database columns and/or database expression(s) received as user inputs. For example, the inbound projection of the parsed query (q.3) may include:

(ID, ADDRESS, (expression, e.g. '*'))

The abovementioned columns 'ID' and 'ADDRESS' are selected from the database table 'CUSTOMER' as they are received as user inputs. Outbound projection may include database columns to be retrieved from the database tables based on the expression mentioned in the query. The outbound projection includes column(s) to be retrieved and returned in the return set 208 based of the parsed query (q.3). For example, the outbound projections may include:

(CID, ADD, (all columns from 'CUSTOMER' table are retrieved based on the asterisk expression '*' provided in the query (q.3)))

Once the inbound projection and the outbound projection are extracted from the parsed query, the extracting module 226 sends details of the extracted inbound projection and the outbound projection to the expression identifier 228. The expression identifier 228 may also receive the parsed query from the extracting module 226.

In one embodiment, the expression identifier 228 identifies an expression associated with the parsed query (q.3). For example, based on the parsed query (q.3) and the inbound projection and the outbound projection received from the extracting module 226, the expression identifier 228 identifies asterisk expression '*' in the query (q.3). Upon identifying the expression the expression identifier 228 sends the identified asterisk expression '*' to the data retrieving module 232 along with the extracted inbound projection and outbound projection and the parsed query (q.3). For example, based on the parsed query (q.3) the following data are sent to the data retrieving module 232:

database table: 'CUSTOMER'
inbound projection: (ID, ADDRESS, expression, e.g. '*')
outbound projection: (CID, ADD, all columns from 'CUSTOMER' table)
identified expression: asterisk expression '*'

In an embodiment, the data retrieving module 232 communicates with the database 230 to retrieve data based on query 202. The data retrieving module 232 may also send information such as identified expression, the inbound projection and the outbound projection along with the query 202 to the database 230. In one embodiment, the data retrieving module 232 also determines the database table in the parsed query (q.3) and further checks if such database table exists in the database 230. Additionally, the data retrieving module 232 also checks whether the received inbound projection and the outbound projection are valid. The data retrieving module 232 of the database engine 220 may receive retrieved data 206 from the database 230. The retrieved data 206 may include data tuples from the required database table 'CUSTOMER'. The data retrieving module 232 forwards the retrieved data 206 to the determining module 234. The determining module 234 based on the identified expression, e.g. asterisk expression '*' determines a return set 208 from the retrieved data 206. The return set 208 for the query (q.3), shown in Table 6.

This results in duplicate data in the return set 208. The duplicate date is retained in the return set 208, due to the usage of the asterisk expression '*' in the received query (q.3). In SQL, the asterisk expression '*' fails to check whether any of the column(s) mentioned in the inbound projection are selected twice along with the rest of columns of the database table. In the above example, columns 'CID' and 'ADD' are retrieved as they constitute the outbound projection of the received query (q.3). Columns 'ID' and 'ADDRESS' are retrieved as they constitute the inbound projection of the received query (q.3) due to the presence of the asterisk expression '*'. However, column 'CID' is same as column 'ID' and column 'ADD' is same as column 'ADDRESS'. In other words, the end-user requests renaming of the column 'ID' as 'CID' and the column 'ADDRESS' as 'ADD' in the query (q.3). Therefore, same columns are retrieved twice and this causes duplicate data entries in the result set. This may further result in errors in the underlying tables or return sets generated.

In an exemplary embodiment, a query (q.4) that includes pseudo column expression '( . . . )' is executed instead of query (q3). For example, query q4 includes:

(q.4) SELECT CUSTOMER.ID AS CID, CUSTOMER.ADDRESS AS ADD, ( . . . ) FROM CUSTOMER;

The extracting module 226 extracts the inbound projection and outbound projection from the parsed query (q.4). For example, the inbound projection of the parsed query (q.3) may include:

(ID, ADDRESS, (expression, e.g. ( . . . )))

The outbound projections extracted by the extracting module 226 from the parsed query (q.4) may include:

(CID, ADD, (columns from 'CUSTOMER' table are retrieved except columns ID and ADDRESS, based on the expression ( . . . ) provided in the query (q.4)))

In an embodiment, once the inbound projection and the outbound projection are extracted from the parsed query, the extracting module 226 sends details of the extracted inbound projection and the outbound projection to the expression identifier 228. The expression identifier 228 also receives the parsed query from the extracting module 226. The expression identifier 228 identifies the expression associated with the parsed query (q.4) and the extracted inbound projection and the outbound projection. For example, the expression identifier identifies the expression associated with the parsed query (q.4), e.g. '( . . . )' or pseudo column expression. Further, the expression identifier 228 sends the identified

TABLE 6

(RETURN SET)

| CID | ADD | ID | NAME | AGE | ADDRESS | PURCHASE |
|---|---|---|---|---|---|---|
| 1 | Delhi | 1 | Sheldon Cooper | 30 | Delhi | 2000.00 |
| 2 | Newtown Square | 2 | Leonard Hoffman | 28 | Newtown Square | 1500.00 |
| 3 | Heidelberg | 3 | Raj Khurana | 35 | Heidelberg | 5000.00 |
| 4 | Bangalore | 4 | Geneva | 41 | Bangalore | 6500.00 |
| 5 | Sydney | 5 | Catelyn Stark | 43 | Sydney | 8500.00 |
| 6 | San Jose | 6 | Jojen Reed | 35 | San Jose | 4500.00 |
| 7 | Munich | 7 | Michael Paul | 32 | Munich | 10000.00 |

The determining module 234 sends the return set 208 as mentioned in the above Table 6, to the user application 210. In this example, the customer identification and customer dwelling address are returned twice in the return set 208 under the following column headings:

customer identification: CID, ID
customer dwelling address: ADD, ADDRESS expression '( . . . )' to the data retrieving module 232 along with the extracted inbound projection, outbound projection and parsed query (q.4). Based on the identified expression received from the expression identifier 228, the data retrieving module 232 retrieves the data tuples from the database 230. The database tuples are retrieved corresponding to the database columns mentioned in the inbound projection and outbound projection from the given database table, e.g. 'CUSTOMER'.

The data retrieving module 232 retrieves data 206 from the database 230 and forwards the retrieved data 206 to the determining module 234. Since, the identified expression is the pseudo column expression '( . . . )', the data retrieving module 232 also notifies the determining module 234 to check for duplicate columns in the retrieved data 206. The determining module 234 determine a return set 208 by excluding duplicate columns from the retrieved data 206. This is done checking the columns included in the inbound projection with the columns included in the outbound projection.

For example, with respect to the abovementioned parsed query (q.4) the following database table, inbound projection, outbound projection and identified expression are received at the data retrieving module 232:

database table: 'CUSTOMER'
inbound projection: (ID, ADDRESS, (expression, e.g. ( . . . )))
outbound projection: (CID, ADD, columns from 'CUSTOMER' table)
identified expression: '( . . . )' or 'pseudo column expression'

In one embodiment, since, the identified expression is the pseudo column expression '( . . . )', the determining module 234 checks for the presence of duplicate columns in the inbound projection and outbound projection. The data is retrieved in the form of tuples, database 230 retrieves data 206 and sends it to the database engine 220. The determining module 234 sends the return set 208 to the user application 210. The return set 208 for the query (q.4), shown in Table 7.

TABLE 7

(RETURN SET)

| CID | ADD | NAME | AGE | PURCHASE |
|---|---|---|---|---|
| 1 | Delhi | Sheldon Cooper | 30 | 2000.00 |
| 2 | Newtown Square | Leonard Hoffman | 28 | 1500.00 |
| 3 | Heidelberg | Raj Khurana | 35 | 5000.00 |
| 4 | Bangalore | Geneva | 41 | 6500.00 |
| 5 | Sydney | Catelyn Stark | 43 | 8500.00 |
| 6 | San Jose | Jojen Reed | 35 | 4500.00 |
| 7 | Munich | Michael Paul | 32 | 10000.00 |

In one embodiment, the customer's 'ID' as 'CID' and 'ADDRESS' as 'ADD' are returned only once in the return set 208 when compared with the return set 208 shown in Table 6. This is due to the usage of the pseudo column expression '( . . . )' in the received query (q.4). SQL pseudo column expression '( . . . )' may decide whether the columns mentioned in the inbound projection are also selected in the outbound projection. If yes, then such columns are to be retrieved in the return set 208 only once. In other words, columns from the database table 'CUSTOMER' are retrieved and the columns having duplicate data are excluded in the return set. In the above example, columns 'CID' and 'ADD' are retrieved as they constitute the outbound projection. Columns 'ID' and 'ADDRESS' are excluded from retrieved tuples shown in Table 7. This is because, column 'CID' has same data as column 'ID' and column 'ADD' has same data as column 'ADDRESS'. This assist the data retrieving module 232 to retrieve the same columns once and also address the issue of duplicate columns in the underlying tables.

Figure 3:
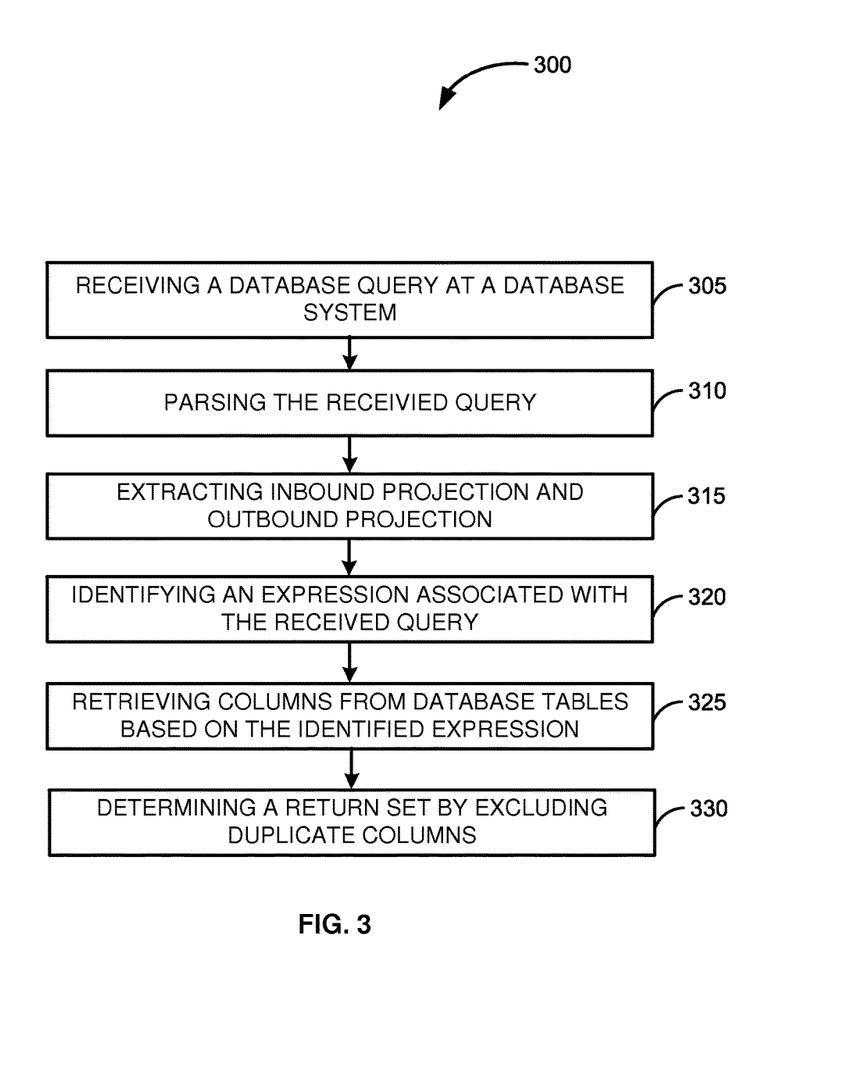
FIG. 3 is a flow diagram illustrating a process for data retrieval, according to one embodiment.

FIG. 3 is a flow diagram of process 300 for data retrieval, according to one embodiment. The process 300 illustrates implementation of a pseudo column expression '( . . . )' for data retrieval. For example, consider following queries for creating database tables 'ORDERS' and 'ORDER_ITEMS'. The table 'ORDERS' may include columns such as 'ORDER_ID', 'ORDER_DATE', and 'CUSTOMER_ID'. The table 'ORDER_ITEMS' may include columns such as 'ORDER_ITEM_ID', 'ORDER_ID', PRODUCT_ID', 'QUANTITY', and 'PRICE'. The following queries for creating the tables 'ORDERS' and 'ORDER_ITEMS' may be written in SQL:

```
CREATE TABLE ORDERS (
ID INT,
ORDER_DATE DATE,
CUSTOMER_ID INT,       -- Foreign key to table CUSTOMERS
PRIMARY KEY (ORDER_ID)
);
CREATE TABLE ORDER_ITEMS (
ORDER_ITEM_ID INT,
ORDER_ID INT,          -- Foreign key to table ORDERS
PRODUCT_ID INT,        -- Foreign key to table PRODUCTS
QUANTITY INT,
PRICE DECIMAL (12, 2),
PRIMARY KEY (ORDER_ITEM_ID);
```

Initially, a query is received at a database system, at block 305. The received query may be written in SQL. The database system may receive the SQL query from a user application via a computer network. In an embodiment, user application may connect with the database system by making an API call. The database system connects with the database by making database calls based on the functions it needs to operate. For example, a SQL query (q.5) may be received at the database system.

(q.5) CREATE VIEW ORDER_DETAILS AS SELECT ORDER.ID AS OID, PRICE*QUANTITY AS TOTAL, ( . . . ) FROM ORDERS JOIN ORDER_ITEMS AS OI ON ORDERS.ID=MID;

Next, at 310, the received query is parsed by the database system. The database system accomplishes this by initiating a parse call to the database. When the parse call is made, the SQL query (q.5) is parsed and validated with respect to syntactic validity and semantic validity. Syntactic validity includes checking for correct spellings and use of keywords, for example, spelling of 'ORDERS' table, or spelling of the 'SELECT', 'AS', 'FROM', 'JOIN', 'ON' SQL command and the like. Semantic validity includes validation of query construction, for example, whether the 'ORDERS' or 'ORDER_ITEMS' tables and the corresponding columns exists in the database. The semantic validity of the query also ensures that the query is correct with respect to query construction database rules, for example, the pseudo column expression '( . . . )' is to be followed by the SQL command 'FROM', since, the vice versa vice versa may not hold true with respect to query construction.

Upon successful parsing of the received query, at 315, the inbound projection and outbound projection associated with the parsed query (q.5) are extracted. For example, the inbound projection of the parsed query (q.5) may include:

(ID, PRICE, QUANTITY, (expression e.g. '( . . . )'))

The aforementioned columns 'ID' and 'PRICE*QUANTITY' are selected from the database tables 'ORDERS' and 'ORDER_ITEMS' that forms the inbound projection. The inbound projection include columns or column names received as a user input the given query (q.5). In other words, the inbound projection include column names that the end-user wishes to see in the return set. The end-user may also see renamed columns or column names in the underlying tables. The outbound projection include columns or column names to be retrieved from the database tables based on the parsed query (q.5). For example, the outbound projections may include:

(OID, TOTAL, (all columns from 'ORDERS' and 'ORDER_ITEMS' tables are retrieved except columns ID, based on the pseudo column expression ( . . . ) provided in the query (q.5)))

Once the inbound projection and the outbound projection are extracted, at block 320, an expression associated with the parsed query for data retrieval are identified. For example, in the parsed query (q.5) that includes the pseudo column expression '( . . . )' is identified. At block 325, based on the extracted inbound projection, outbound projection, and identified expression, the columns from the given database tables are retrieved.

The columns from the database tables may be retrieved after performing the SQL query operation, e.g. 'JOIN'. Typically, the 'JOIN' clause is used to combine data from two database tables. When the above mentioned query (q.5) is executed, a return set is generated upon execution of the SQL command 'CREATE VIEW'. For example, an underlying table 'ORDER_DETAILS' is generated as the return set. The underlying table 'ORDER_DETAILS' is created upon performing 'JOIN' operation on the database tables 'ORDERS' and 'ORDER_ITEMS'. Typically, a 'VIEW' can be created from a single database table, multiple database tables, or from previously created 'VIEWs'. The return set also includes column names to be included in the underlying table 'ORDER_DETAILS'.

At block 330, a return set is determined by excluding duplicate columns from retrieved columns from database tables. The return set determined after executing the query (q.5) is shown below:

```
ORDER_DETAILS (
OID INT,    -- (column in the inbound projection received as user input)
TOTAL DECIMAL (12, 2),   -- (of column in the inbound
                             projection received as user input)
ORDER_DATE DATE,
CUSTOMER_ID INT,
ORDER_ITEM_ID INT,
PRODUCT_ID INT,
QUANTITY INT,
PRICE DECIMAL (12, 2)
);
```

As shown in the above example, the database system retrieves column 'OID' from the database table 'ORDERS' only once in the return set of the query (q.5). This is due to the usage of the pseudo column expression '( . . . )' in query (q.5). SQL pseudo column expression '( . . . )' checks whether any columns mentioned in the inbound projection are also selected in the outbound projection. If yes, then such columns are to be retrieved only once in the return set. In other words, columns from the database tables 'ORDERS' and 'ORDER_ITEMS' are retrieved after excluding the columns of the inbound projection. In the above example, columns 'OID' and 'TOTAL' mentioned in the inbound projection are retrieved. Columns 'ID', 'ORDER_ID' are excluded from retrieved return set. This is because, column 'OID' is same as column 'ID' of the database table 'ORDERS'. Also, column 'ORDER_ID' from the database table 'ORDER_ITEMS' is same as the column 'ID' from the database table 'ORDERS'. In an embodiment, the pseudo column expression '( . . . )' successfully addresses the issue of retrieving duplicate columns in the underlying tables.

In another exemplary embodiment, the pseudo column expression '( . . . )' may be implemented in any database query, where the end-user is required to delete certain number columns from the underlying table(s) created. Instead of writing two separate queries, e.g. one for creating the underlying table and second for deleting the unwanted columns from the underlying table, a single query including the pseudo column expression '( . . . )' may be written. For example, consider that the following SQL query (q.7) at the user application is received for the above mentioned database tables 'ORDERS' and 'ORDER_ITEMS'.

(q.7) CREATE VIEW ORDER_DETAILS AS SELECT ORDERS.ID AS OID, PRICE*QUANTITY AS TOTAL, ( . . . /PRICE, QUANTITY) FROM ORDERS JOIN ORDER_ITEMS AS OI ON ORDERS.ID=MID;

The query (q.7) is received by the database system from the user application. Once the received query (q.7) is successfully parsed at the database system, for further processing, a first inbound projection, a second inbound projection and the outbound projection are extracted from the parsed query (q.7). For example, the first inbound projection, second inbound projection and outbound projection of the parsed query (q.7) may include:

```
first inbound projection: (ID, PRICE, QUANTITY, (expression, e.g. '(.../
    PRICE, QUANTITY)'))
second inbound projection: (PRICE, QUANTITY)   -- (columns
                                                  associated with
                                                  pseudo column
                                                  expression '(...)')
outbound projection: (OID, TOTAL, (columns from 'ORDERS' and
    'ORDER_ITEMS' tables are retrieved except
    columns ID, PRICE, QUANTITY, based on the
    expression (...) provided in the query (q.7)))
```

Since, the query (q.7), also includes columns 'PRICE' and 'QUANTITY' associated with the pseudo column expression '( . . . )' this constitutes the second inbound projection. In other words, the second inbound projection may include column names as a user input in the query (q.7) to exclude unwanted columns from the return set. The pseudo column expression '( . . . )' checks whether the column(s) mentioned in the first inbound projection are included in the outbound projection from the database tables 'ORDERS' and 'ORDER_ITEMS'. If yes, then such column(s) are to be retrieved in the return set only once, e.g. column 'OID' from the database table 'ORDERS' is retrieved only once in the return set. In addition, the pseudo column expression '( . . . )' also checks whether the column(s) mentioned in the second inbound projection are included in the outbound projection from the database tables 'ORDERS' and 'ORDER_ITEMS'. For example, the query (q.7) includes columns 'PRICE' and 'QUANTITY' associated with the pseudo column expression '( . . . /PRICE, QUANTITY)'. If yes, then such column(s) are unwanted columns and excluded from the return set. In other words, the end-user don't want to see the aforementioned columns, e.g. columns 'PRICE' and 'QUANTITY', in the return set, e.g. database table 'ORDER_DETAILS'. The return set generated after executing the query (q.7) is shown below:

```
ORDER_DETAILS (
OID INT,         -- (column in the inbound projection received as user input)
TOTAL DECIMAL (12, 2),   -- (column in the inbound projection
                            received as user input)
ORDER_DATE DATE,
CUSTOMER_ID INT,
ORDER_ITEM_ID INT,
PRODUCT_ID INT,
);
```

When the above mentioned return set of the query (q.7) are compared with the previously generated return set of the query (q.6), the underlying table 'ORDER_DETAILS' does not include the columns 'PRICE' and 'QUANTITY'. In one embodiment, the pseudo column expression may be used for writing optimized database queries. This facilitates in reducing line of codes from the database queries.

In an embodiment, the pseudo column expression '( . . . )' may be implemented instead of the asterisk expression '*' in any database query language. The symbol '( . . . )' for the pseudo column expression may have different proprietary extensions or symbols for different query languages. In an embodiment, the pseudo column expression '( . . . )' may be implemented to retrieve optimized number of database columns from the given database tables. This addresses the issue of retrieving duplicate columns from the database tables stored in the database(s).

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 4:
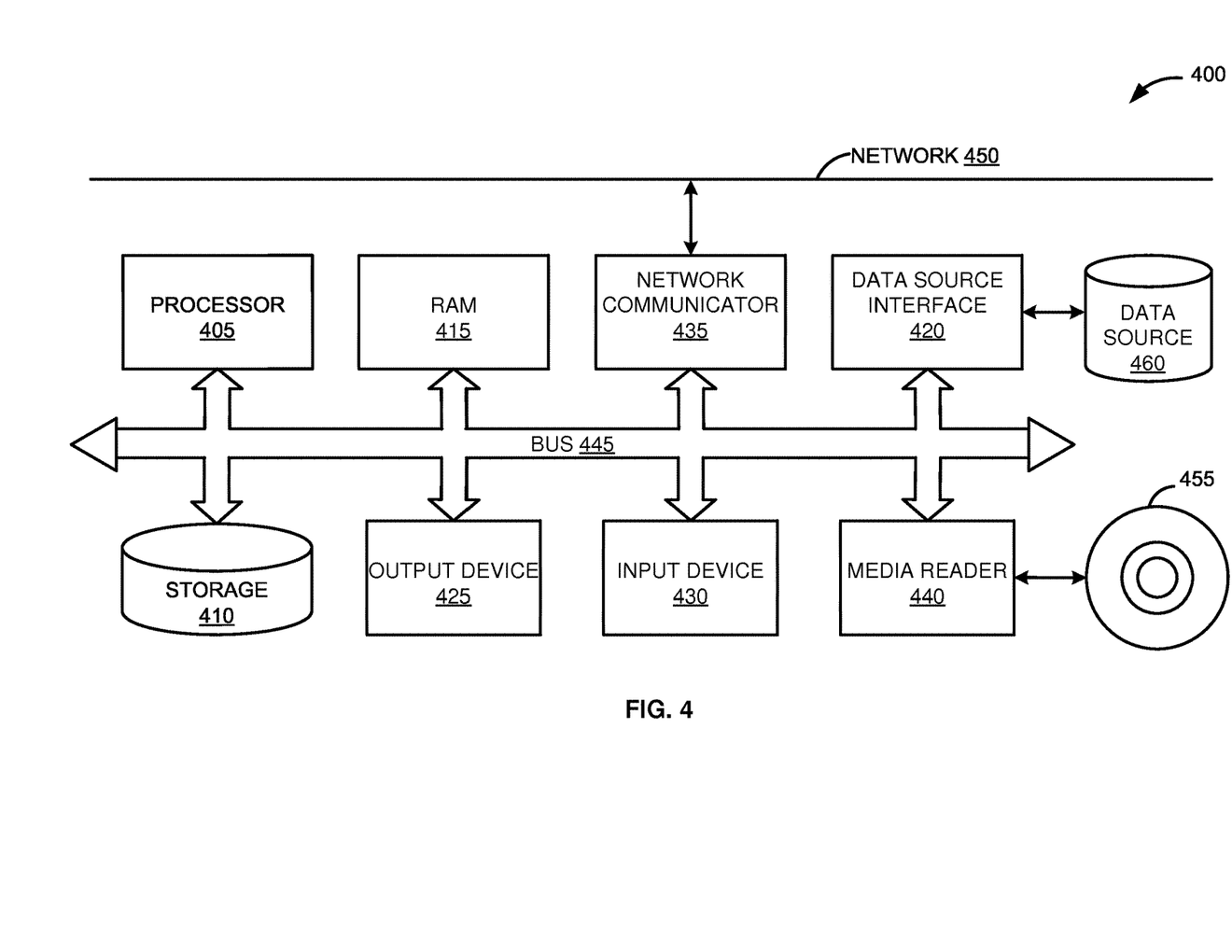
FIG. 4 is a block diagram illustrating a computing environment to retrieve data based on pseudo column expression, according to one embodiment.

FIG. 400 is a block diagram of an exemplary computer system 400. The computer system 400 includes a processor 405 that executes software instructions or code stored on a computer readable storage medium 455 to perform the above-illustrated methods. The processor 405 can include a plurality of cores. The computer system 400 includes a media reader 440 to read the instructions from the computer readable storage medium 455 and store the instructions in storage 410 or in random access memory (RAM) X15. The storage 410 provides a large space for keeping static data where at least some instructions could be stored for later execution. According to some embodiments, such as some in-memory computing system embodiments, the RAM 415 can have sufficient storage capacity to store much of the data required for processing in the RAM 415 instead of in the storage 410. In some embodiments, the data required for processing may be stored in the RAM 415. The stored instructions may be further compiled to generate other representations of the instructions and dynamically stored in the RAM 415. The processor 405 reads instructions from the RAM 415 and performs actions as instructed. According to one embodiment, the computer system 400 further includes an output device 425 (e.g., a display) to provide at least some of the results of the execution as output including, but not limited to, visual information to users and an input device 430 to provide a user or another device with means for entering data and/or otherwise interact with the computer system 400. Each of these output devices 425 and input devices 430 could be joined by one or more additional peripherals to further expand the capabilities of the computer system 400. A network communicator 435 may be provided to connect the computer system 400 to a network 450 and in turn to other devices connected to the network 450 including other clients, servers, data stores, and interfaces, for instance. The modules of the computer system 400 are interconnected via a bus 445. Computer system 400 includes a data source interface 420 to access data source 460. The data source 460 can be accessed via one or more abstraction layers implemented in hardware or software. For example, the data source 460 may be accessed by network 450. In some embodiments the data source 460 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on. In the above description, numerous specific details are set forth to provide a thorough understanding of embodiments. Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope of the one or more embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to retrieve data from a database based on a pseudo column expression, the method comprising:
   receiving a query for retrieving data from the database;
   parsing the query;
   extracting a first inbound projection including a plurality of columns specified in the query and a pseudo column expression that is used as a replacement for an asterisk expression in the query, and a first outbound projection including a plurality of alias columns corresponding to the plurality of columns specified in the query;
   identifying the pseudo column expression included in the retrieved first inbound projection, wherein the pseudo column expression eliminates duplicate columns from one or more database tables specified in the query based on the plurality of columns specified in the first inbound projection;
   based on the identified pseudo column expression and the extracted first inbound projection and the extracted first outbound projection, retrieving data from the one or more database tables; and
   determining a return set from the retrieved data based on the identified pseudo column expression.

2. The computer implemented method according to claim 1, wherein identifying the pseudo column expression, further comprises:
   determining whether a second inbound projection is associated with the identified pseudo column expression in the received query, wherein the second inbound projection includes a plurality of columns from the one or more database tables, received as a second user input to exclude unwanted columns from the retrieved return set, in the received query; and
   upon determining that the second inbound projection is associated with the identified pseudo column expression, modifying the retrieved return set.

3. The computer implemented method according to claim 2, wherein modifying the retrieved return set, further comprises:
   checking whether the plurality of columns from the second inbound projection are included in the plurality of columns from the first outbound projection to determine the unwanted columns; and
   upon determining the unwanted columns, generating a modified return set by excluding the determined unwanted columns from the one or more database tables, from the retrieved return set.

4. The computer implemented method according to claim 1, wherein the method comprising:
   Identifying a pseudo column expression in the retrieved first inbound projection; and
   retrieving the return set including the plurality of columns from the first inbound projection and the plurality of alias columns from the first outbound projection.

5. A computer system to retrieve data from a database based on a pseudo column expression, the system comprising:
   a memory to store a program code;
   a processor communicatively coupled to the memory, the processor configured to execute the program code to:
   receive a query to retrieve data from the database;
   parse the query;
   extract a first inbound projection including a plurality of columns specified in the query and a pseudo column expression that is used as a replacement for an asterisk expression in the query, and a first outbound projection including a plurality of alias columns corresponding to the plurality of columns specified in the query;
   identify the pseudo column expression included in the retrieved first inbound projection, wherein the pseudo column expression eliminates duplicate columns from one or more database tables specified in the query based on the plurality of columns specified in the first inbound projection;
   based on the identified pseudo column expression and the extracted first inbound projection and the extracted first outbound projection, retrieve data from the one or more database tables; and
   determine a return set from the retrieved data based on the identified pseudo column expression.

6. The computer system according to claim 5, wherein the processor executes the program code to identify pseudo column expression, further comprises:
   determine whether a second inbound projection is associated with the identified pseudo column expression in the received query, wherein the second inbound projection includes a plurality of columns from the one or more database tables, received as a second user input to exclude unwanted columns from the retrieved return set, in the received query; and
   upon determining second inbound projection is associated with the identified pseudo column expression, modify the retrieved return set.

7. The computer system according to claim 6, wherein the processor executes the program code to modify the retrieved return set, further comprises:
   check whether the plurality of columns from the second inbound projection are included in the plurality of columns from the first outbound projection to determine the unwanted columns; and upon determining the unwanted columns, generate a modified return set by excluding the determined unwanted columns from the one or more database tables, from the retrieved return set.

8. The computer system according to claim 5, wherein the processor executes the program code to:

enable the identified pseudo column expression to determine the plurality of columns having identical data under different column names, in the retrieved return set.

9. The computer system according to claim 5, wherein the processor executes the program code to:

identify a pseudo column expression in the retrieved first inbound projection; and retrieve the return set including the plurality of columns from the first inbound projection and the plurality of alias columns from the first outbound projection.

10. A non-transitory computer readable storage medium to tangibly store instructions, which when executed by a computer, cause the computer to:

receive a query to retrieve data from a database;

parse the query;

extract a first inbound projection including a plurality of columns specified in the query and a pseudo column expression that is used as a replacement for an asterisk expression in the query, and a first outbound projection including a plurality of alias columns corresponding to the plurality of columns specified in the query;

identify the pseudo column expression included in the retrieved first inbound projection, wherein the pseudo column expression eliminates duplicate columns from one or more database tables specified in the query based on the plurality of columns specified in the first inbound projection;

based on the identified pseudo column expression and the extracted retrieved first inbound project and the extracted first outbound projection, retrieve data from the one or more database tables; and determine a return set from the retrieved data based on the identified pseudo column expression.

11. The non-transitory computer readable medium according to claim 10, further comprising instructions, which when executed by the computer, further causes the computer to:

determine whether a second inbound projection is associated with the identified pseudo column expression, wherein the second inbound projection includes a plurality of columns from the one or more database tables, received as a second user input to exclude unwanted columns from the retrieved return set, in the received query; and upon determining that the second inbound projection is associated with the identified pseudo column expression, modify the retrieved return set.

12. The non-transitory computer readable medium according to claim 11, further comprising instructions, which when executed by the computer, further causes the computer to:

check whether the plurality of columns from the second inbound projection are in the plurality of columns from the first outbound projection to determine the unwanted columns; and upon determining the unwanted columns, generate a modified return set by excluding the determined unwanted columns from the one or more database tables, from the retrieved return set.

13. The non-transitory computer readable medium according to claim 10, further comprising instructions, which when executed by the computer, further causes the computer to:

enable the identified pseudo column expression to determine the plurality of columns having identical data under different column names, in the retrieved return set.

14. The non-transitory computer readable medium according to claim 10, further comprising instructions, which when executed by the computer, further causes the computer to:

identify a pseudo column expression from in the retrieved first inbound projection; and retrieve the return set including the plurality of columns from the first inbound projection and the plurality of alias columns from the first outbound projection.

* * * * *